United States Patent Office 3,408,884
Patented Nov. 5, 1968

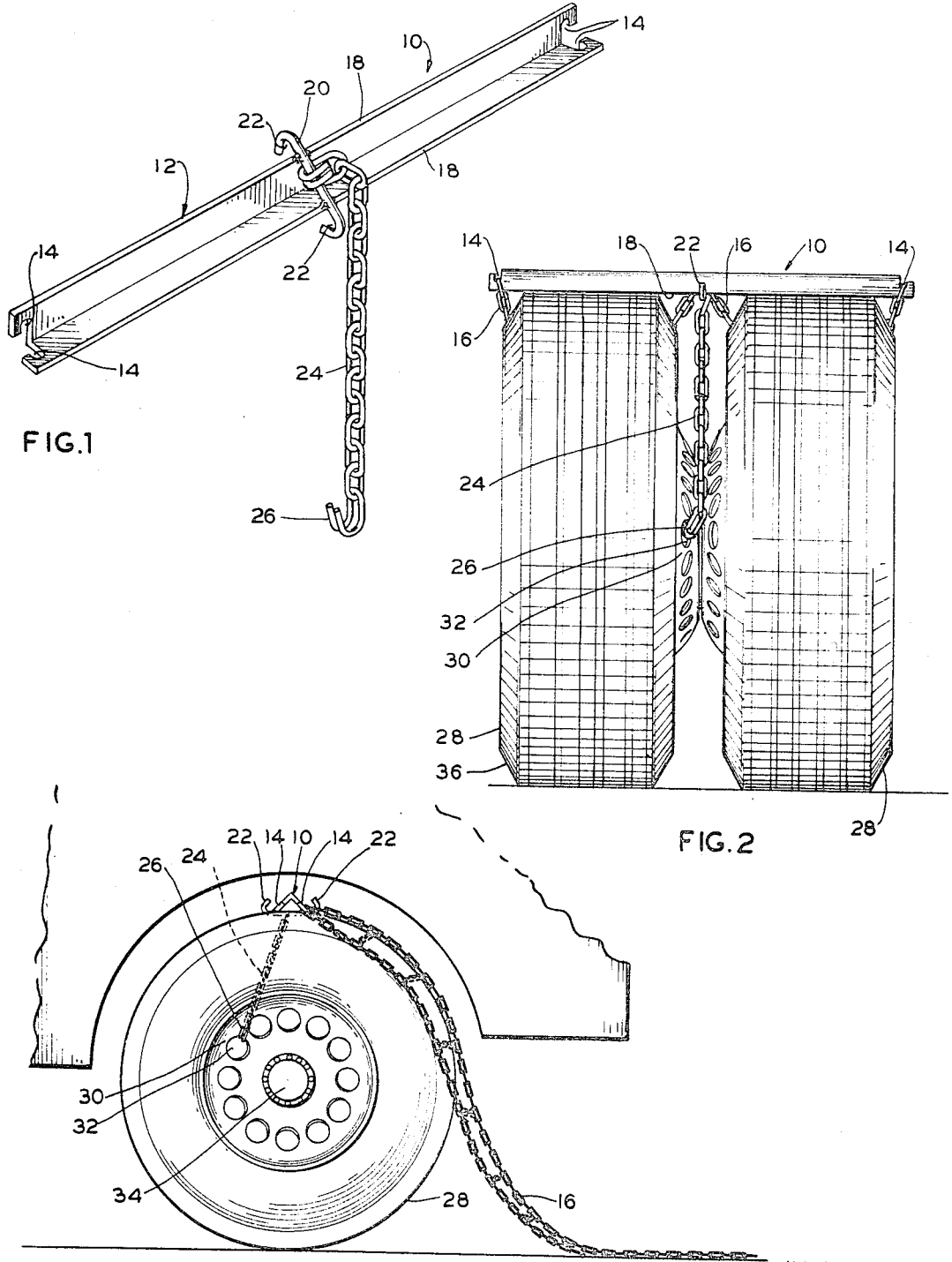

3,408,884
TIRE CHAIN APPLYING TOOL
Ray S. Musgrove, 9663 Margo Ann Lane,
St. Louis, Mo. 63134
Filed Mar. 24, 1967, Ser. No. 625,649
7 Claims. (Cl. 81—15.8)

ABSTRACT OF THE DISCLOSURE

This tire chain applying tool is designed to apply tire chains to dual tires such as are ordinarily used on trucks or buses. It consists of a bar adapted to lie on the outer periphery of the tires and a chain attached to the center of the bar for attaching the bar to the tires. The tire chains are then hooked to the bar and wrap around the tires as the tires are turned.

---

This invention relates to a new and useful improvement in tire chain applying tools wherein it is desired to provide a device which will simplify the application of tire chains to sets of two or more tires on the same axle.

In order to properly apply a tire chain to sets of truck and bus tires, two methods are commonly used. The first method is to lay the tire chain upon the ground and to move the truck or bus until the wheel is in position on the tire chain. The obvious difficulty with this method is that many times the vehicle is stuck. In addition, it is ordinarily difficult to move the vehicle in just the right spot so that the tire chain will be centered with respect to the tire so as not to clamp any of the cross chains and thereby make the tire chain applying operation even more difficult.

The second method ordinarily used includes packing the vehicle off of the ground, placing the center portion of the tire chain over the tire and then wrapping the tire chain into the proper position. However, it is obvious that this method of manually wrapping the tire chain about the tire is a disagreeable task since the tires and tire chains are usually both wet and dirty at the time tire chains are required.

It is the main object of this invention to provide a device which will enable tire chains to be wrapped about one or more tires in a set simply and easily with a minimum of effort.

Another object of this invention is to provide a device which will enable one or more tire chains to be wrapped about one or more tires in a set, even when the vehicle cannot be moved.

Still another object of this invention is to provide a tire changing tool which can be easily attached or removed from a set of tires.

Some of the advantages of the inventoin lie in its simplicity of construction, its convenient and expeditious operation and its adaptability to economical manufacture.

With the above more important objects and advantages in view, and other objects and advantages as may become apparent as this specification proceeds, the invention consists essentially in the arrangement and construction of parts as illustarted in the accompanying drawings in which:

FIGURE 1 is a perspective view of the invention.

FIGURE 2 is a front elevational view illustrating the application of the invention to a set of two tires.

FIGURE 3 is a side elevational view showing the invention in use during the installation of tire chains to a set of tires.

Like characters of reference are employed to designate like parts in the specification and throughout the several views.

Referring now to the drawings, a tire chain applying tool 10 made in accordance with the present invention is shown to include a substantially V-shaped bar 12 terminating at either of its lengthwise ends into arcuately shaped hooks 14 which are adapted to accommodate one end of tire chains 16, and terminating at its widthwise ends in corners 18. Integrally attached to the corners 18 in about the center of the bar 12 is a rod 20 which terminates at both ends in hooks 22 which are adapted to accommodate the other end of the tire chains 16. A chain 24 is secured at one end to the rod 20 and has attached to its other end a hook 26 as can be more fully seen in FIGURE 1.

From FIGURE 2, it can be seen that there exists between dual tires 28, a hub 30, having a plurality of holes 32 about the axle 34. In operation, the tire chain applying tool 10 is used by inserting the hook 26 in one of the more conveniently assessable holes 32 and then moving the bar 12 until the chain 24 becomes taut and the corners 18 rest on the outer peripheries 36 of the tires 28. At this point, one end of a tire chain 16 is engaged to one of arcuately shaped hooks 14 while the other end of the tire chain 16 is engaged to one of hooks 22. The tire chain 16 is then strung out in the direction of movement of the tire 28, and this same process is then repeated for the other tire 28.

At this point, the associated vehicle may be driven for a short distance so as to effect substantially a complete revolution of the tires 28 so that the tire chains 16 will wind themselves so to speak, around the tires 28. The ends of the tire chains 16 are then removed from the arcuately shaped hooks 14 and hooks 22. The bar 12 is then moved along the outer peripheries 36 of the tires 28 until the chain 24 is no longer taut. Hook 26 is then disengaged from the hole 32, thus removing the tire chain applying tool 10 from the tires 28.

It is to be understood that the bar 12 may be made of any resilient material that will withstand the weight of a vehicle moving over it. In addition, the bar 12 may be made of such a length as to be used for two or more tires that are in juxtaposition to each other on the same axle for the purpose of applying simultaneously two or more tire chain units 16.

While there has been described and illustrated a preferred embodiment of the present invention, it is apparant numerous alternatives, deletions and additions may be made without departing from the spirit thereof.

I claim:

1. A tire chain applying tool for applying tire chains to one or more tires in a set comprising a resilient bar-like member with a plurality of tire chain engagement means along its length, said length being sufficient to span the combined width of the tires in said set, securing means disposed centrally of and movably attached to said bar-like member, and connecting means attached to said securing means for attaching said bar-like member to a tire hub so that the bar-like member is retained upon the outer periphery of the tires.

2. A tire chain applying tool in accordance with claim 1 wherein the plurality of tire chain engagement means consist of a plurality of arcuately shaped hooks integral with said bar-like member and a rod-like member terminating at both ends in hooks secured to said bar-like member.

3. A tire chain applying tool in accordance with claim 2 wherein one end of the securing means is secured to the rod-like member.

4. A tire chain applying tool in accordance with claim 3 wherein the securing means consists of a chain.

5. A tire chain applying tool in accordance with claim 1 wherein the bar-like member consists of two flat bars integrally secured to each other at one of their sides and each terminating at its other sides in smooth corners adapted to lie flush on the outer periphery of the tires.

6. A tire chain applying tool in accordance with claim 1 wherein the plurality of tire chain engagement means are spaced from each other along the length of the bar-like member at intervals of approximately the width of the tire plus the width of the hub.

7. A tire chain applying tool in accordance with claim 6 wherein the securing means is secured to the bar-like member at a distance of approximately the width of the tire plus the width of the hub from an end of said bar-like member.

References Cited

UNITED STATES PATENTS

| | | | |
|---|---|---|---|
| 1,372,195 | 3/1921 | Rounds | 81—15.8 X |
| 1,500,409 | 7/1924 | Melton et al. | 81—15.8 X |
| 2,947,337 | 8/1960 | Ambeau | 152—220 |

FOREIGN PATENTS

| | | |
|---|---|---|
| 215,800 | 2/1958 | Australia. |
| 1,196,381 | 5/1959 | France. |

ROBERT C. RIORDON, *Primary Examiner.*

R. V. PARKER, JR., *Assistant Examiner.*